United States Patent [19]

Corbin et al.

[11] Patent Number: 5,320,490
[45] Date of Patent: Jun. 14, 1994

[54] STRUCTURAL ARM OF THE CASING OF A TURBO-ENGINE

[75] Inventors: Claude G. Corbin, Voisenon; Joël Foucard, Ceyrat; Pierre A. Glowacki, Fontaine le Port, all of France

[73] Assignee: Societe Nationale d'Etude et de Construction de Moteurs d'Aviation "S.N.E.C.M.A.", Paris, France

[21] Appl. No.: 990,183

[22] Filed: Dec. 14, 1992

[30] Foreign Application Priority Data

Dec. 18, 1991 [FR] France ................... 91 15693

[51] Int. Cl.⁵ ............................................. F01D 25/28
[52] U.S. Cl. ................................. 415/209.3; 415/209.2
[58] Field of Search ................ 415/209.2, 209.3, 208.2

[56] References Cited

U.S. PATENT DOCUMENTS

| 4,594,761 | 6/1986 | Murphy et al. | 415/208.2 |
| 4,722,184 | 2/1988 | Chaplin et al. | 415/210.1 |
| 4,832,568 | 5/1989 | Roth et al. | 415/189 |
| 4,940,386 | 7/1990 | Feuvrier et al. | 415/209.3 |
| 4,993,918 | 2/1992 | Myers et al. | 415/209.2 |
| 5,180,282 | 1/1993 | Lenhart et al. | 415/209.2 |

FOREIGN PATENT DOCUMENTS

| 0219445 | 4/1987 | European Pat. Off. . |
| 2522362 | 9/1983 | France . |
| 732920 | 6/1955 | United Kingdom ............ 415/209.3 |

Primary Examiner—Edward K. Look
Assistant Examiner—Michael S. Lee
Attorney, Agent, or Firm—Oblon, Spivak, McClelland, Maier & Neustadt

[57] ABSTRACT

A casing structural arm of a turbo-engine is fixed between an external ferrule and a hub of the casing and is formed as a composite material. The arm has one leading edge, one trailing edge, one radially external edge and one radially internal edge. These four edges define the four corners of the arm and securing of the arm to the ferrule and said hub is ensured by two pairs of linking braces respectively secured to the four corners of the arm.

8 Claims, 3 Drawing Sheets

STRUCTURAL ARM OF THE CASING OF A TURBO-ENGINE

FIELD OF THE INVENTION

The present invention concerns the structural arms of the casing of a turbo-engine and more specifically the arms of the double-flow casings of a turbojet engine.

BACKGROUND OF THE INVENTION

These structural arms are generally made of titanium owing to the high resistance of this substance. However, so as to reduce the weight of these arms, it has been considered to make them from a composite material. Now, the diameters of turbojet engine casings, especially currently studied double-flow casings, are so large that a large number of problems are posed concerning the resistance of these composite material arms, the transmission of stresses by these arms over a significant distance length, as well as the linking of these arms, namely first with the metallic hub of the casing and secondly with the external ferrule, which is also metallic.

European patent EP-A-O 274 293 has already described a double flow turbo-engine inlet casing comprising a set of arms made of a composite material disposed radially, each of them comprising a metallic tie rod forming the central core of this arm. The tie rod is fixed between the external ferrule and the internal hub and is prestressed via the tightening of a nut. Accordingly, the hub is a floating type hub and is borne by said radial tie rods. However, this type of device does not reduce the overall weight of the casing since the weight gain obtained by the use of the composite material is compensated by the relatively heavy metallic tie rod.

Patent application FR-A-2 522 362 also describes the mounting elements provided on one internal casing and on one external casing and fitted with housings intended to respectively receive one of the two extremities of a vane. These mounting elements make it possible to instal and remove a vane separately and elastically support these vanes.

Finally, the patent application FR-A-2 610 673 also describes a multiflow turbojet engine with an external blowing rectifier ring and comprising a stage of vanes with fixed rectifiers without a platform and regularly disposed between one internal ring and one external ring. These internal and external rings have a set of notches allowing for fixing the two extremities of the vanes of the rectifier.

The two devices described above complicate the construction of the casing and require the addition of mounting elements. Thus further increasing the overall weight of the casing.

SUMMARY OF THE INVENTION

Accordingly, the object of the invention is to overcome the aforesaid drawbacks.

To this effect, the invention concerns a structural arm of the casing of a turbo-engine. The arm is fixed between one external ferrule. The arm is the hub of the casing and made of a composite material and has one leading edge, one trailing edge, one radially external edge and one radially internal edge, these four edges defining the four corners of the arm.

According to the characteristics of the invention, securing of this arm to the ferrule and said hub is ensured by two pairs of linking braces respectively secured to the four corners of said arm.

Thus, contrary to the case with the prior art, only the four corners of the arm are fixed. This makes it possible to simplify construction. These fixings are embodied at the most stressed locations of the arm.

Each linking brace preferably includes a sole provided with at least two points for securing it to the ferrule or the hub, at least one locking portion projecting from this sole and having a housing intended to receive one of the four corners of the arm, this housing being defined by two lateral edges approximately perpendicular to the plane of the sole and by one extremity edge covering the leading edge or trailing edge of the arm and at least one chucking pin traversing the two lateral edges of the locking portion and one of the four corners of the arm.

These braces make it possible to link the arms directly with the hub and the metallic ferrule while ensuring the proper transmission of stresses through these arms.

The brace preferably includes at least one fixing block extending outwardly from the free extremity of one of the lateral edges of the locking portion and approximately parallel to the sole, this fixing block being intended to support a platform restoring the vein at the level of the hub between two consecutive arms.

In fact, as the arm is fixed via its braces above the level of the internal ferrule, these braces appear in the air pipe and would risk interfering with the circulation of the air flow. On the other hand, the presence of the platform makes it possible to have a ferrule having a surface limiting the flow of continuous air.

The structural arm is preferably embodied by a draping of successive layers of fiber fabrics made of a composite material forming its external casing and includes a reinforcement piece on at least any one of its four corners, this reinforcement piece being embodied via the draping of additional layers of fiber fabrics made of a composite material.

This arm further includes a central recess inside the casing constituting it and this central recess is filled to the level of the leading edge and the trailing edge of the arm by support fibers disposed unidirectionally along the longitudinal axis of said arm.

Thus, casing arms are obtained which are extremely resistant at the level of the leading or trailing edges while being much lighter than arms made of titanium owing to the presence of the central recess and the nature of the materials used. These arms are also less expensive. In addition, the stresses are correctly transmitted inside these arms, even if the latter are extremely long.

BRIEF DESCRIPTION OF THE DRAWINGS

The invention shall be more readily understood from a reading of the following description given by way of explanation with reference to the accompanying drawings in which.

DESCRIPTION OF THE PREFERRED EMBODIMENTS

Figure 1:
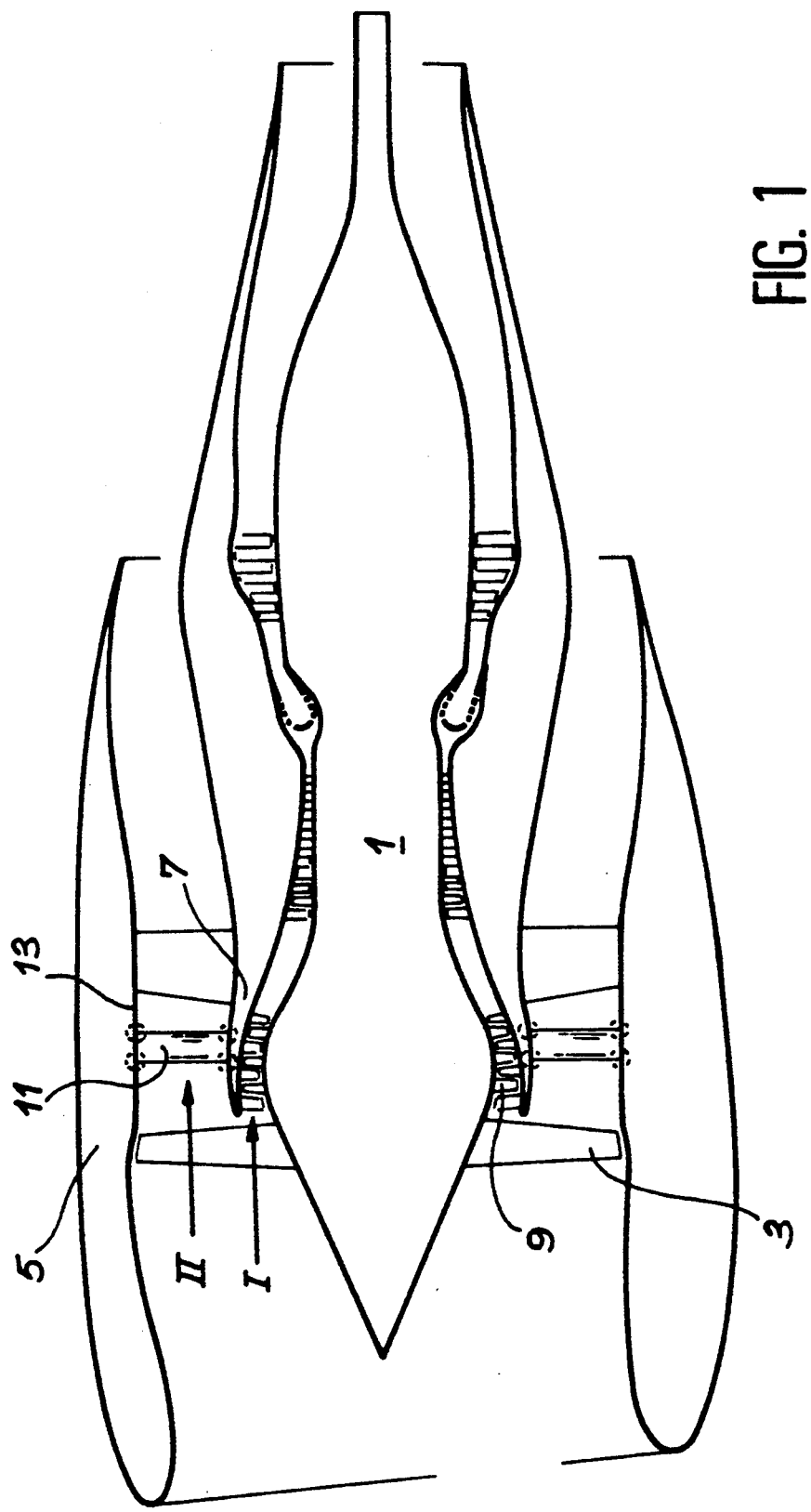
FIG. 1 shows a view of the entire casing of a turbo-engine.

FIG. 1 shows a double flow turbojet engine. This turbojet engine conventionally includes a central body 1 in front of which is placed a blower 3, this body being surrounded by an annular boat 5. An internal annular hub 7 is placed around the central body 1 and inside the boat 5. Inside this double flow turbojet engine, the entering flow of air is divided primary flow I which traverses the low pressure compressor 9, whose vanes are disposed between the main body 1 and the internal hub 7, and a secondary flow II which passes between the internal hub 7 and the boat 5. As opposed to the primary flow I, the secondary flow II does not receive any thermal energy. It is able to increase the thrust of the turbojet engine. The casing structural arms of the present invention are given the reference 11 and are placed between the internal hub 7 and an external ferrule 13 forming the internal portion of the boat 5.

These structural arms will now be described in greater detail.

Figure 2:
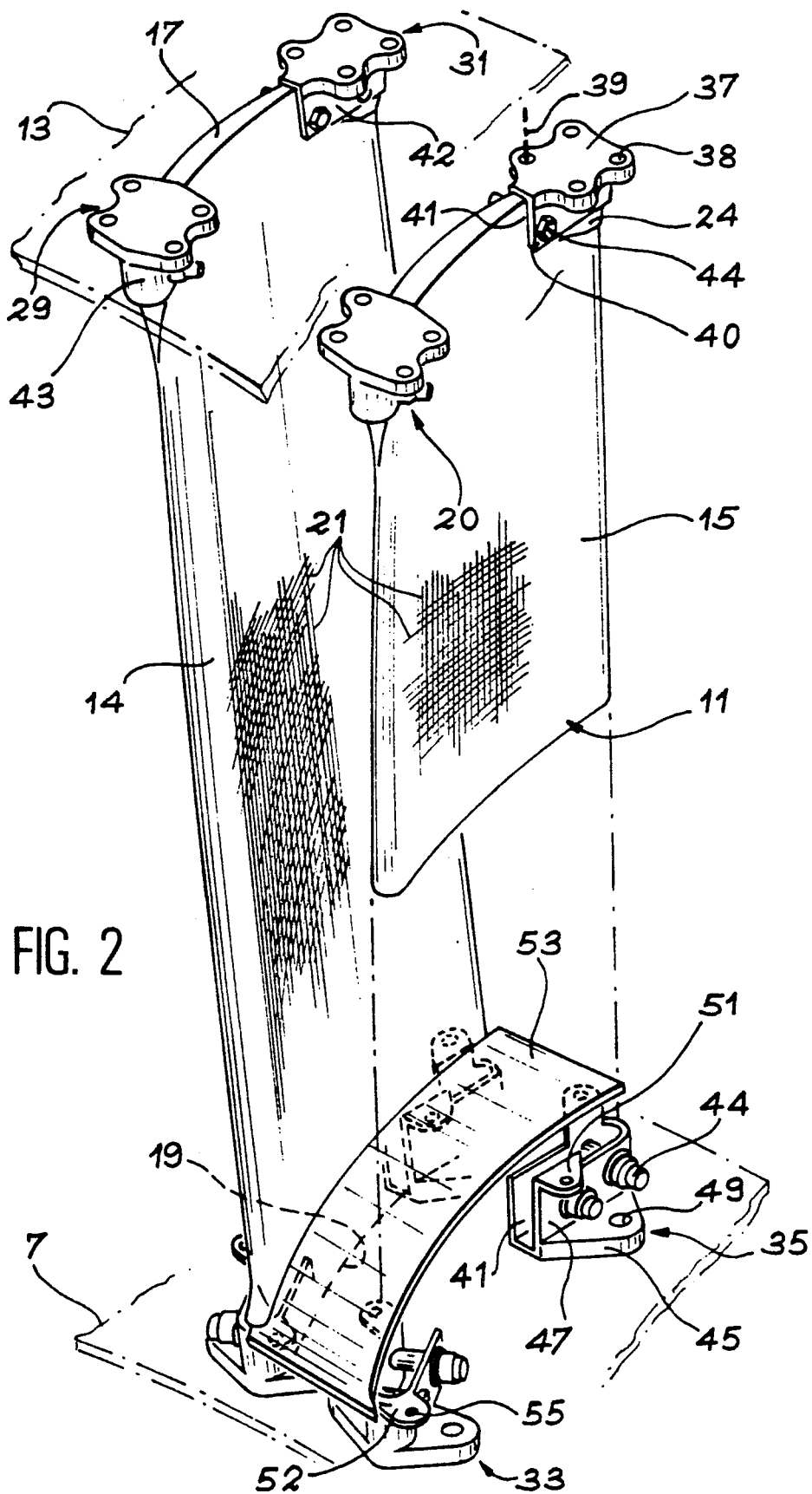
FIG. 2 shows a perspective view of two structural arms according to the invention.

As shown on FIG. 2, these structural arms 11 are elongated elements extending radially around the hub 7 shown by the dotted lines. Each of these arms includes one leading edge 14, one trailing edge 15, one radially external edge 17 and one radially internal edge 19. These four edges define the four corners 20 of the arm.

Figure 3:
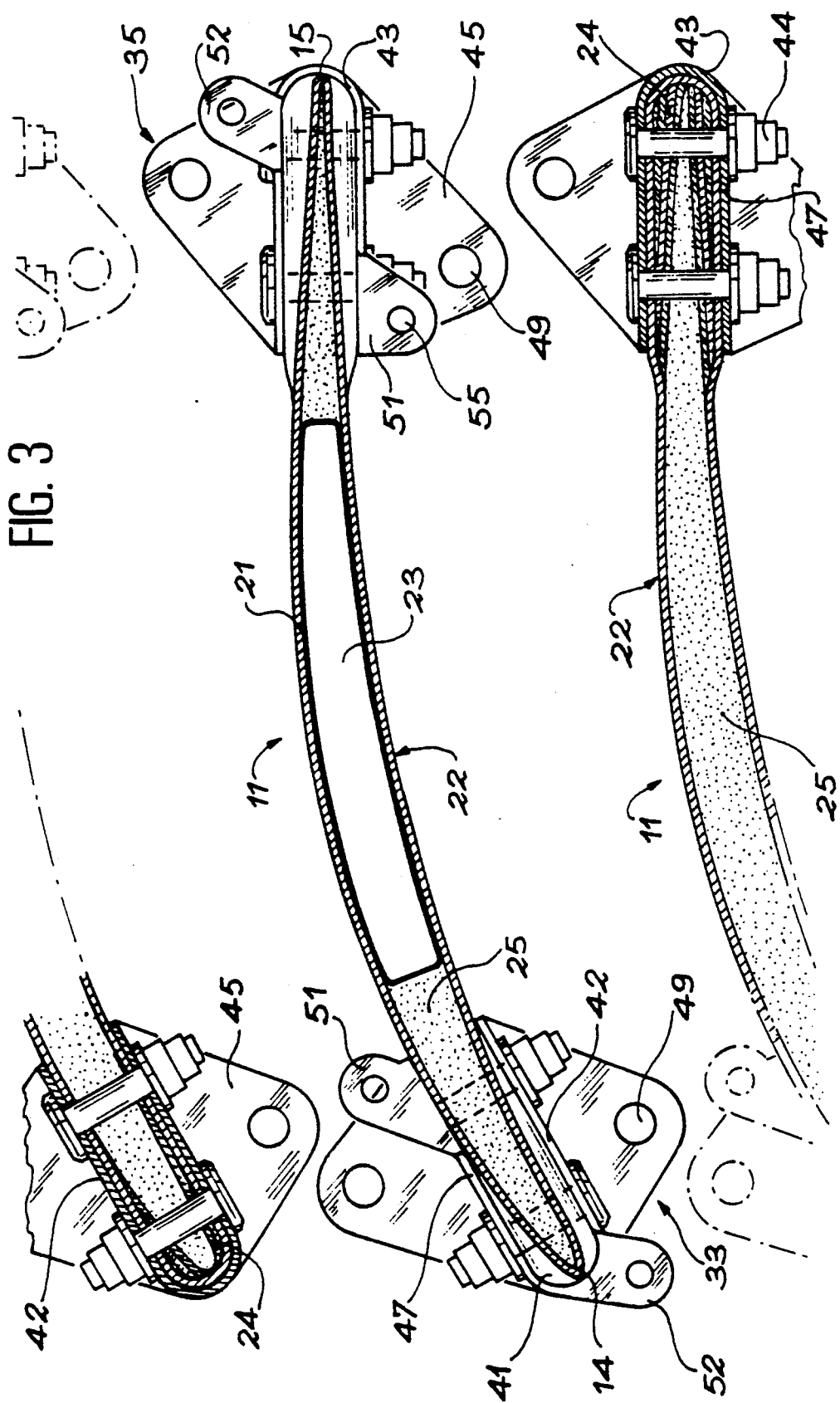
FIG. 3 is a partial cutaway view of three structural arms according to the invention.

As shown on FIG. 3, each arm 11 is embodied via the draping of several layers of fiber fabrics 21 forming the external casing of this arm and are given the reference 22.

According to one first embodiment, this arm 11 has a central recess 23 inside the casing 22. The two extremities of the arm, that is the portion forming the leading edge 14 and the portion forming the trailing edge 15, are internally filled by support fibers 25 disposed unidirectionally along the longitudinal axis of said arm. This is obtained via the deposing of several layers of fiber fabrics 25 superimposed inside these portions of central recess 23. Then the entire arm is heated so as to polymerize the fibers.

Accordingly, the four braces are disposed around a more resistant full portion and not around a recess.

According to a second embodiment of the invention (not shown on FIG. 3), the central recess 23 may also be filled with support fibers 25 disposed unidirectionally along the longitudinal axis of the arm. This is embodied similarly to what was described previously for the leading and trailing edges.

The arm 11 may be stressed in any direction since it is subjected firstly to radial forces, and secondly to axial forces due to the incoming flow of air. As a result, it is necessary that the various successive layers of fiber fabrics made of a composite material are disposed so as to be crossed. In other words, two successive layers of fiber fabrics constituting the casing 22 are disposed so that the fibers 21 constituting them are angularly offset by an angle of between 45 and 90 degrees. Thus by way of illustrative example, the first fiber fabric layer may be disposed so that the fibers 21 constituting it are parallel to the longitudinal axis of the arm and the next layer may be deposited so that the fibers 21 constituting it form an angle of 90 degrees with the fibers 21 of the first layer, that is are perpendicular to the longitudinal axis of the arm, and then the next layer is deposited at 45 degrees with respect to the axis of the arm, etc. However, the order and number of layers may vary, the aim simply being to have successive crossed layers so as to possess better tensile strength.

In addition, the four corners 20 of the arm 11 need to be reinforced since they are strongly stressed by the linking braces. To this effect, additional layers of composite fiber fabrics 21 are draped over the four corners 20 of the arm 11 so as to form reinforcements 24. These reinforcements 24 forming an additional fabric thickness appear clearly in FIG. 3 where they are solely shown on the first and third arms.

The two linking braces secured to the two corners defined by the radially external edge 17 of the arm and the leading edge 14 or trailing edge 15 are respectively given reference numbers 29 and 31. Similarly, the two other linking braces secured to the two corners defined by the radially internal edge 19 of the arm and the leading edge 14 or trailing edge 15 are respectively given the references 33 and 35.

The two radially external linking braces 29 and 31 are symmetrical and thus only the brace 31 is described. This brace 31 includes a sole 37 with four lobes and provided with four orifices 38 for being secured to the external ferrule 13 diagrammatically shown on FIG. 2. These four fixing orifices 38 allow for the passage of screws 39 forming fixing points (only one screw being shown on FIG. 2).

The brace 31 further includes one blocking portion 40 forming a projection from the sole 37. This blocking portion has a housing 41 intended to receive the corner 20 of the arm formed by its radially external edge 17 and its trailing edge 15. The housing 41 is defined by two lateral edges approximately perpendicular to the plane of the sole 37 and by an extremity edge 43 covering the trailing edge 15. The extremity edge 43 is shown more clearly on the linking brace 29. Conversely, this linking brace 29 covers the leading edge 14. The blocking portion 40 is in addition pierced by (preferably) four orifices allowing for passage of two chucking pins 44 of the brace 31 onto the arm 11. These two chucking pins 44 are disposed roughly parallel to the plane of the sole 37. These chucking pins 44 are constituted by a screw and a bolt.

The linking brace 33 is symmetrical with the brace 35 and solely the latter shall be described in detail.

The brace 35 also has a losange-shaped sole 45 and a blocking portion 47 projecting from this sole 45 in a similar way to the one described for the linking braces 29 and 31. This blocking portion 47 covers the trailing edge 15 of the arm. The sole 45 further has two points or fixing pins 49 disposed on both sides of the blocking portion 47 and allows the brace to be secured to the hub 7.

In addition, the brace 35 has at least one fixing block (preferably two) extending outwardly from the free extremity of one of the lateral edges 42 of the blocking portion 47 roughly parallel to the sole 45. It shall be observed that, on each linking brace 33 or 35, one of the two fixing blocks is fitted towards the open U-shaped extremity of the blocking portion 47 and that the other fixing block 52 is provided roughly at the level of the extremity edge 43. These fixing blocks 51 and 52 are intended to support a platform 53 restoring the vane at the level of the hub 7 between two consecutive arms (see FIG. 2). Each fixing block 51, 52 is fitted with an orifice 55 allowing for the passage of a fixing screw (not shown) for fixing said platform.

In addition, the brace 35 has two chucking pins 44 traversing the blocking portion 47 similarly to what was described for the linking braces 29 and 31.

The linking braces 29, 31, 33, 35 are advantageously made of metal. They may be forged, cast or machined.

It has been observed that the arms of the double flow casing embodied in this way are much better adapted than the metallic arms for receiving stresses.

Finally, it shall be observed that the foregoing description has mainly been given for the fixing of a double flow casing arm and this type of fixing could be adapted to other structural arms made of a composite material, for example to any other fixed portion with sufficiently large dimensions (such as a rectifier) of a turbojet engine.

What is claimed is:

1. Structural arm of the casing of a turbo-engine fixed between one external ferrule and a hub of the casing, the arm comprising:
    a composite material and having one leading edge, one trailing edge, one radially external edge and one radially internal edge, said edges defining four corners of the arm;
    two pairs of linking braces respectively secured to the four corners of said arm so as to secure the arm to the ferrule and the hub, wherein each linking brace includes a sole fitted with at least two members for securing each said brace to one of the ferrule and the hub wherein at least one blocking member projects from the sole and has a housing for receiving one of the four corners of the arm and wherein at least one chucking pin transverses two lateral edges of the blocking member and one of the four corners of the arm.

2. Structural arm of the casing of a turbo-engine according to claim 1, wherein the housing of the blocking member comprises two lateral edges approximately perpendicular to the plane of the sole and one edge covering one of the leading edge and trailing edge of the arm.

3. Structural arm of the casing of a turbo-engine according to claim 2, wherein at least one of the linking braces includes at least one fixing block extending towards the outside from a free extremity of one of the lateral edges of the blocking member approximately parallel to the sole, and wherein a platform for restoring air flow near the hub between two adjacent arms is supported by said at least one fixing block.

4. Structural arm of the casing of the turbo-engine according to claim 1, wherein said arm comprises successive layers of fiber fabrics made of a first composite material forming an external casing and includes a reinforcement piece on at least one of the four corners, wherein said reinforcement piece comprises successive layers of fiber fabrics made of a second composite material.

5. Structural arm of the casing of the turbo-engine according to claim 4, wherein said arm comprises a central recess located inside the external casing of the arm and wherein the central recess is partially filled at a leading edge portion and at a trailing edge portion of the arm with support fibers disposed unidirectionally along the longitudinal axis of said arm.

6. Structural arm of the casing of the turbo-engine according to claim 4, wherein said arm comprises a central recess located inside the external casing of the arm and wherein the central recess is completely filled by support fibers disposed unidirectionally along the longitudinal axis of said arm.

7. Structural arm of the casing of the turbo-engine according to any one of claims 4 to 6, wherein the fiber fabric of the external casing comprises two successive layers of the fiber fabric disposed so that the fibers are angularly offset by an angle of between about 45 to 90 degrees.

8. Structural arm of the casing of the turbo-engine according to claim 1, wherein the linking braces are made of metal.

* * * * *